(12) United States Patent
Wilson et al.

(10) Patent No.: US 6,292,779 B1
(45) Date of Patent: Sep. 18, 2001

(54) SYSTEM AND METHOD FOR MODELESS LARGE VOCABULARY SPEECH RECOGNITION

(75) Inventors: Brian Wilson, Arlington; Manfred Grabherr, Somerville; Ramesh Sarukkai, Billerica; William F. Ganong, III, Brookline, all of MA (US)

(73) Assignee: Lernout & Hauspie Speech Products N.V., Ieper (BE)

( * ) Notice: Subject to any disclaimer, the term of this patent is extended or adjusted under 35 U.S.C. 154(b) by 0 days.

(21) Appl. No.: 09/267,925

(22) Filed: Mar. 9, 1999

Related U.S. Application Data

(60) Provisional application No. 60/077,922, filed on Mar. 13, 1998, provisional application No. 60/077,738, filed on Mar. 12, 1998, and provisional application No. 60/077,337, filed on Mar. 9, 1998.

(51) Int. Cl.[7] .................................................. G10L 15/14
(52) U.S. Cl. ........................................ 704/257; 704/256
(58) Field of Search ................................ 704/200, 238, 704/231, 256, 257, 255, 251, 239, 240

(56) References Cited

U.S. PATENT DOCUMENTS

| | | | |
|---|---|---|---|
| 5,677,991 | 10/1997 | Hsu et al. | 395/2.64 |
| 5,737,489 | * 4/1998 | Chou et al. | 704/256 |
| 5,794,196 | 8/1998 | Yegnanarrayanan et al. | 704/255 |
| 5,799,279 | 8/1998 | Gould et al. | 704/275 |
| 5,832,430 | * 11/1998 | Lleida et al. | 704/256 |
| 5,850,627 | 12/1998 | Gould et al. | 704/231 |
| 6,029,124 | * 2/2000 | Gillick et al. | 704/200 |
| 6,076,056 | * 6/2000 | Huang et al. | 704/254 |

FOREIGN PATENT DOCUMENTS

| | | |
|---|---|---|
| 196 35 754 | 3/1996 | (DE). |
| WO 96/13829 | 9/1996 | (WO). |

* cited by examiner

*Primary Examiner*—Richemond Dorvil
(74) *Attorney, Agent, or Firm*—Bromberg & Sunstein LLP

(57) ABSTRACT

A modeless large vocabulary continuous speech recognition system is provided that represents an input utterance as a sequence of input vectors. The system includes a common library of acoustic model states for arrangement in sequences that form acoustic models. Each acoustic model is composed of a sequence of segment models and each segment model is composed of a sequence of model states. An input processor compares each vector in a sequence of input vectors to a set of model states in the common library to produce a match score for each model state in the set, reflecting the likelihood that a state is represented by a vector. The system also includes a plurality of recognition modules and associated recognition grammars. The recognition modules operate in parallel and use the match scores with the acoustic models to determine at least one recognition result in each of the recognition modules. The recognition modules includes a dictation module for producing at least one probable dictation recognition result, a select module for recognizing a portion of visually displayed text for processing with a command, and a command module for producing at least one probable command recognition result. An arbitrator uses an arbitration algorithm and a score ordered queue of recognition results, together with their associated recognition modules, to compare the recognition results of the recognition modules to select at least one system recognition result.

24 Claims, 2 Drawing Sheets

SYSTEM AND METHOD FOR MODELESS LARGE VOCABULARY SPEECH RECOGNITION

The present application claims priority from U.S. provisional application No. 60/077,337, filed Mar. 9, 1998, from U.S. provisional application No. 60/077,738, filed Mar. 12, 1998, and from U.S. provisional application No. 60/077,922, filed Mar. 13, 1998, all of which are herein incorporated by reference.

FIELD OF THE INVENTION

The present invention relates to a speech recognition system, and more particularly to a flexible speech recognition system for large vocabulary continuous speech dictation which also recognizes and acts upon command and control phrases embedded in a user provided dictation stream.

BACKGROUND ART

Speech recognition systems allow a user to operate and control other applications such as word processors, spreadsheets, databases, etc. Accordingly, a useful speech recognition system allows a user to perform to broad functions: (1) dictate input to an application, and (2) control the input and the application. One approach of prior art systems has been to provide separate dictation processing and control processing modes and require the user to switch between the two modes. Thus, operating mode would be definitely known by the system, since positive direction by the user was necessary to change processing modes.

Another approach was described by Hsu in U.S. Pat. No. 5,677,991 and Yegnanarayanan in U.S. Pat. No. 5,794,196, both of which are incorporated herein by reference in their entirety, in which input speech was parsed by both a large vocabulary isolated word recognition module and a small vocabulary continuous speech recognition module each having an associated application context. Hypotheses produced by the large vocabulary isolated word speech recognition module would correspond to dictated text while hypotheses produced by the small vocabulary continuous speech recognition module would correspond to short application specific command and control sequences. Each recognition module would produce hypotheses corresponding to the input speech and an associated recognition probability or score. An arbitration algorithm would then select the better scoring hypothesis as a recognition result and direct the result to the associated context.

The approach of Hsu and Yegnanarayanan represented an advance in that a user of the speech recognition system no longer needed to toggle between dictation mode and command mode, rather the system automatically determined whether a given portion of an input utterance should be treated as dictated text or as application related command directives. However, Hsu and Yegnanarayanan explicitly limit the large vocabulary speech recognition module to an isolated word approach which requires a user to pause unnaturally between each word of dictated text.

SUMMARY OF THE INVENTION

A preferred embodiment of the present invention represents a method for operating a modeless large vocabulary continuous speech recognition system of the type that represents an input utterance as a sequence of input vectors. The method includes:

(a) providing a common library of acoustic model states for arrangement in sequences that form acoustic models;

(b) comparing each vector in a sequence of input vectors to a set of model states in the common library to produce a match score for each model state in the set reflecting the likelihood that such state is represented by such vector; and (c) using, in a plurality of recognition modules operating in parallel, the match scores with the acoustic models to determine at least one recognition result in each of the recognition modules.

In a further embodiment, each acoustic model may be composed of a sequence of segment models and each segment model may be composed of a sequence of model states. The match score may be a probability calculation or a distance measure calculation. Each recognition module may include a recognition grammar used with the acoustic models to determine the at least one recognition result. The recognition grammar may be a context-free grammar, a natural language grammar, or a dynamic command grammar. In addition, or alternatively, the method may further include comparing the recognition results of the recognition modules to select at least one system recognition result. The step of comparing may use an arbitration algorithm and a score ordered queue of recognition results and associated recognition modules. The plurality of recognition modules may include one or more of a dictation module for producing at least one probable dictation recognition result, a select module for recognizing a portion of visually displayed text for processing with a command, and a command module for producing at least one probable command recognition result.

A related embodiment provides a modeless large vocabulary continuous speech recognition system of the type that represents an input utterance as a sequence of input vectors. The system includes a common library of acoustic model states for arrangement in sequences that form acoustic models; an input processor that compares each vector in a sequence of input vectors to a set of model states in the common library to produce a match score for each model state in the set reflecting the likelihood that such state is represented by such vector; and a plurality of recognition modules operating in parallel that use the match scores with the acoustic models to determine at least one recognition result in each of the recognition modules.

In a further embodiment, each acoustic model may be composed of a sequence of segment models and each segment model may be composed of a sequence of model states. The match score may be a probability calculation or a distance measure calculation. Each recognition module may include a recognition grammar used with the acoustic models to determine the at least one recognition result. The recognition grammar may be a context-free grammar, a natural language grammar, or a dynamic command grammar. In addition, or alternatively, the system may further include an arbitrator that compares the recognition results of the recognition modules to select at least one system recognition result. The arbitrator may include an arbitration algorithm and a score ordered queue of recognition results and associated recognition modules. The plurality of recognition modules may include one or more of a dictation module for producing at least one probable dictation recognition result, a select module for recognizing a portion of visually displayed text for processing with a command, and a command module for producing at least one probable command recognition result.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Large vocabulary speech recognition dictation systems heretofore known require an extended sequence of correctly formatted spoken commands even to perform relatively simple command and control functions. See, for example, application Ser. No. 08/669,242, filed Jun. 24, 1996, allowed for issuance on Feb. 4, 1998, a continuation-in-part of application Ser. No. 08/496,979, filed Jun. 30, 1995, now issued as U.S. Pat. No. 5,677,991; such patent and such applications are hereby incorporated herein by reference. Moreover, some relatively common features are not even supported in existing speech recognition dictation systems. For instance, to create a table in some existing applications, the system will not recognize spoken commands to create a table, but requires use of a mouse or keyboard. Even in command sequences which are recognized, the format and sequence of the commands must be followed with little or no variation to perform the desired function correctly.

A preferred embodiment of the present invention correctly identifies and performs command and control functions embedded by the user in a stream of dictated text without requiring an exact sequence or predefined format. For instance, to create a table, the user may say:

"Insert a two by three table here," or

"Add a table here," or

"Make a two by three table," or

"Create a table here."

Similar commands composed by the user in a natural language form comfortable at that particular time may be properly recognized and acted upon by the system.

Figure 1:
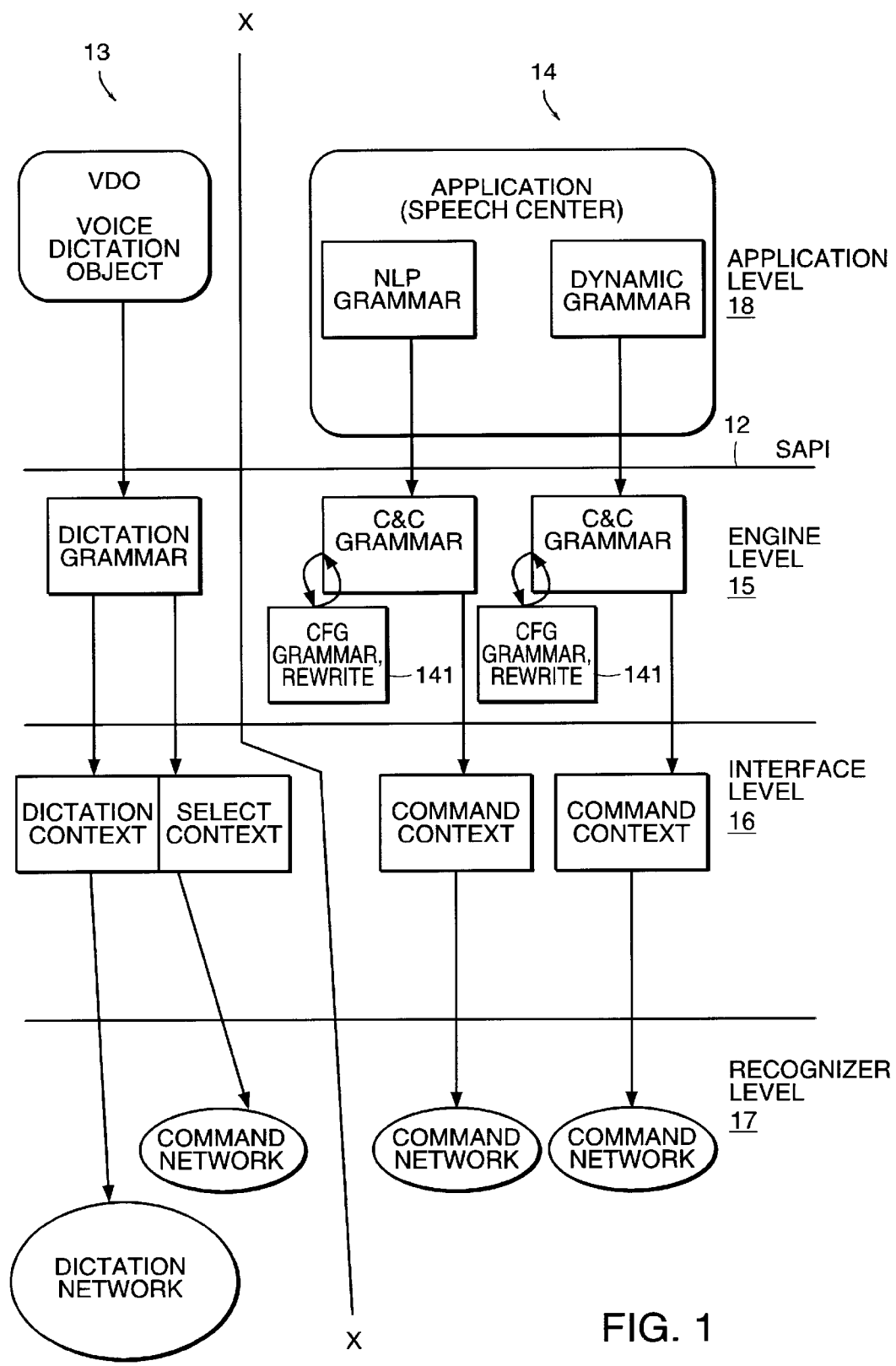
FIG. 1 illustrates a block diagram of simultaneous recognition networks established for active applications in accordance with a preferred embodiment of the invention.
Figure 2:
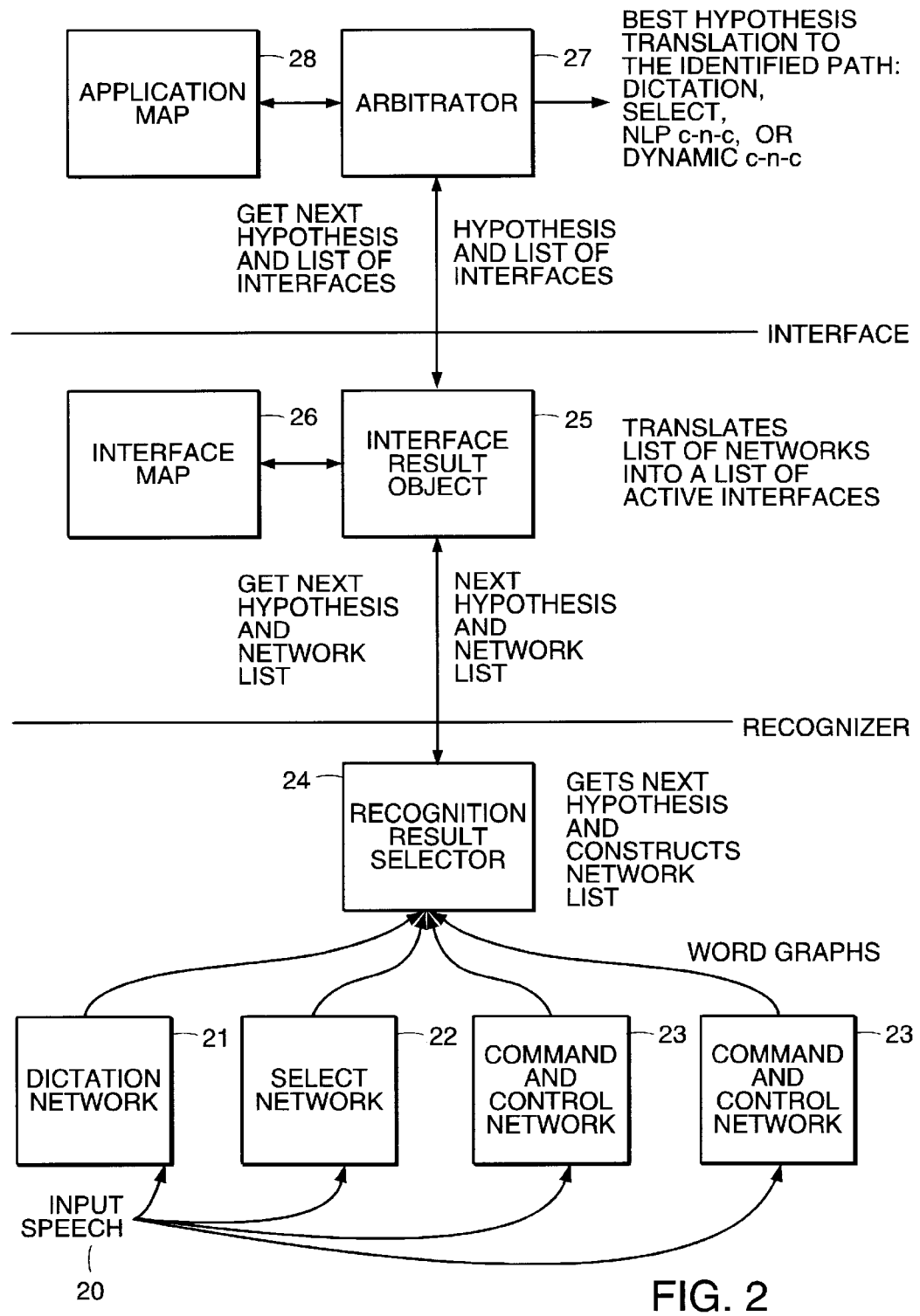
FIG. 2 illustrates a block diagram of operation of an arbitration algorithm in accordance with a preferred embodiment of the invention.

FIGS. 1 and 2 illustrate in broad terms a preferred embodiment of the present invention. FIGS. 1 and 2 also show various levels of operation of the embodiment. The highest level is the application level 18, which exists above the line 12 representing the Speech Application Programming Interface (SAPI).

As illustrated in FIG. 1, a preferred embodiment implements a flexible speech recognition dictation system which incorporates both a large vocabulary continuous speech dictation path 13 and one or more limited-vocabulary, application-associated command and control paths 14 which operate simultaneously in parallel on a user provided spoken input. These two paths are here divided by dashed line X—X. The large vocabulary continuous speech dictation path 13 of the embodiment employs a combination of acoustic models and language models to perform multiple search passes on the spoken input and generates scores indicating the degree of match of the input utterance with an identified sequence of the respective models. The limited-vocabulary, application-associated command and control path 14 utilizes acoustic models in combination with context free grammars 141 to generate scores indicating the degree of match of the input utterance with at least one of the recognizable commands. An arbitration algorithm then selects among the scores and models generated by the recognition networks. Preferably, the scores generated by the respective networks are scaled by a factor or factors empirically trained to minimize incursions by each of the networks on correct results from the other vocabulary. In an embodiment, the input speech may be provided to the system from an audio object, be processed by the speech recognizer, and then provided as output to another computer application, such as a word processing program or accounting spreadsheet, via the speech application programming interface (SAPI) 12.

In FIG. 1 are also shown successively deeper layers of the embodiment. The large vocabulary dictation context 13 operates across the SAPI 12 in a Voice Dictation Object (VDO) 11 which typically causes the display of dictated text. Just as a user in a keyboard operated word processing program may have multiple documents open at one time, a dictation system user may multiple open VDOs. The natural language process (NLP) grammars and dynamic grammar constituting a part 14 of the embodiment providing command and control contexts may act on an application such as a word processing application. FIG. 1 also shows levels beneath the SAPI including the engine level 15, wherein the various grammar rules are applied, and the interface level 16, wherein multiple dictation contexts at the VDO level 18 are mapped to a single dictation context for use at the recognizer level 17. At the recognizer level 17, each active context constructs working recognition hypotheses and associated probabilities.

FIG. 2 illustrates operation of the system to arbitrate among the hypotheses generated for a given input utterance by each active context. Arbitration consists of selecting the best scoring recognition result hypothesis, identifying the active context which produced that hypothesis and directing the hypothesis to the corresponding application-level path. FIG. 2 shows an input utterance 20 being directed to a recognition network for each active context; a dictation network 21, a select network 22, and command and control networks 23. The dictation network uses a sophisticated and elaborate processing scheme which requires substantial system computational resources; however, use of intermediate dictation network calculations by the other recognition networks, along with other efficiency measures, allows existing commercial computer systems to perform the simultaneous multiple recognition network processing utilized by preferred embodiments of the present invention.

The recognition hypotheses and their associated probabilities are grouped together with their associated context by the recognition result selector 24 which forms a precedence ordered queue of (hypothesis, context) ordered pairs known as the hypothesis list. The hypothesis list is retrieved by the interface result object 25 which uses the interface map 26 to map the hypothesis list onto the active context models. The arbitrator 27 gets the translated hypothesis list from the interface result object 25, selects the best scoring hypothesis, and directs it to the appropriate application-level path according to the application map 28.

In common with many prior art systems, a preferred embodiment of the system of the present invention operates by transforming an input speech signal into a sequence of digitally encoded speech frames as is well known in the art. The input frames are further processed by describing them each with N parameters, producing a sequence of N-dimensional vectors. A preferred embodiment then utilizes sequence state acoustic models in the form of Hidden Markov Models (HMMs) with continuous observation densities as is known in the art and described, for example, in Rabiner and Juang, *Fundamentals of Speech Recognition*, pp. 350–52, Prentice Hall, 1993, which reference is hereby incorporated herein by reference. The initial processing of the input data also estimates the beginning and end of a word or phrase based on an analysis of energy levels such that some adjustable sensitivity threshold is set to distinguish user speech from background noise.

In a preferred embodiment, the acoustic models represent demi-triphones—models of the acoustic transition from the middle of one phoneme (basic speech sound) to the middle of another phoneme, which are left-right context sensitive; that is sensitive to the preceding and following sound units. The sequence of states in the models actually is derived from a relatively small pool of approximately 2000 states which model every specific speech sound. The states are represented as mixture models such that the acoustic modeling measures the distance from the input speech to various model parameters. Typically, the model states are a Gaussian family of probability distribution functions in which the conditional probability of the input, given the state, is a weighted sum of Gaussian probabilities. However, a preferred embodiment uses a simplified version in which the family has an assigned weight such that for a given input speech sequence, the distance is measured from the input to the nearest Gaussian.

In some cases, the input frames are relatively far from the nearest Gaussian so that it would be computationally inefficient to perform the relatively complex computation described above. In such cases, a preferred embodiment simply uses the simpler measurement models produced by the process of vector quantization (VQ) in which the N-dimensional vector acoustic models are represented by sequences of standard or prototype states. Rather than representing spectral distributions, the state indices identify or correspond to probability distribution functions. The state spectral index essentially serves as a pointer into a table which identifies, for each state index, the set of probabilities that each prototype frame or VQ index will be observed to correspond to that state index. The table is, in effect, a precalculated mapping between all possible frame indices and all state indices. Thus, for comparing a single frame and single state, a distance measurement or a measure of match can be obtained by directly indexing into the tables using the respective indices and combining the values obtained with appropriate weighting. It is thus possible to build a table or array storing a distance metric representing the closeness of match of each standard or prototype input frame with each standard or prototype model state. This matrix is further compressed by methods described in U.S. Pat. No. 5,546, 499, issued Aug. 13, 1996 to Lynch et al., which is hereby incorporated into this application by reference.

Natural variations in speaking rate require that some method be employed for time aligning a sequence of frames representing an unknown speech segment with each sequence of acoustic model states representing a vocabulary word. This process is commonly referred to as time alignment. In word recognition, the sequence of frames which constitute the unknown speech segment taken together with a sequence of states representing a vocabulary model, in effect, define a matrix and the time aligning process involves finding a path across the matrix which produces the best score, e.g., least distance or cost. The distance or cost is typically arrived at by accumulating the cost or distance values associated with each pairing of frame index with state index as described previously with respect to the vector quantization process.

In addition to words which are to be recognized, the vocabulary may also include word initial state and word final state noise models along with models of common intrusive noises, e.g. paper rustling, door closing, or a cough. When an acoustic input is best matched with one of these models, a null output or no output is provided. In addition, a preferred embodiment also uses models of word-to-word transition sounds, also called word "glues."

In continuous speech recognition, states corresponding to phones or other sub-units of speech are typically interconnected in a network and decoded in correspondence with the ongoing utterance. A score is progressively built up as the utterance proceeds. This total score is a function both of the degree of match of the utterance with the decoded path and the length of the utterance. A continuous speech recognition system will typically identify the best scoring model sequence and may also identify a ranked list of possible alternative sequences.

The large vocabulary continuous speech dictation network employs various language models to additionally process the input speech, while in parallel one or more limited-vocabulary, application-associated command and control networks uses the acoustic model processing together with context free grammars to process and score the same input speech. In a prior art speech recognizer, this would mean implementing two or more independent and complete speech recognizers. However, preferred embodiments of the present invention share the processing results of the acoustic models to reduce the computational load and the total amount of work done by the system. This computational savings allows a single commercially available computer processor to perform the multiple simultaneous path processing needed to realize preferred embodiments of the present invention.

The large vocabulary continuous speech dictation recognition network employs a three pass search utilizing both a tree-structured network, a linear network, and networks for initial and final noises and for the word glues. The first pass uses at every time step, for reasonably good word beginning times, both the linear network and the unigram tree networks. The linear network, however, is used in conjunction with a bigram word history (i.e., the previous word context is used), and therefore, hopefully will not start a large number of words. The tree lexicon, on the other hand, shares the computation of the words (e.g., which share common phone transcription prefixes), and therefore is not that computationally expensive due to shared system resources; furthermore, most state sequences will be pruned after the first few phones. While a transition into a linear network incorporates the appropriate bigram language model score, the unigram scores of the words are factored into the tree representation of the lexicon. Thus, a "smeared" language model score enables earlier pruning of unwanted unigram extensions.

The first search pass sequences the frames into networks with accumulated scores and calculates times of word endings using Hidden Markov Models (HMMs) which are statistical representations of word sequence probabilities. The statistical processing performed by the first pass includes computing for each state the mixture model distances in a four-layered approach employing, in turn, a squeezed matrix, best branch entries, mixture model approximations, and heuristic stopping of computation. The calculation of the mixture model distances determines the distance of each state from the input frame. The mixture model distance calculations performed by the dictation network are also cached for use by the other recognition networks. When the first pass calculates that a word end has been reached in the input utterance the state scores are updated, and active states of the unigram tree, linear network, word initial and final noises network and the glue network are pruned to delete active states below a threshold value.

The second search pass uses first pass tracking and score array based network construction to produce a word graph of states and probabilities. Starting with the word end scores of the first pass, acoustic and language model distances are calculated for every word that ends that way. This process is described in greater detail in the Lynch patent previously cited. The second pass then uses the mixture model distances (again, also stored to a cache for use by the other recognition networks) to identify sequences of states known as arcs which represent fundamental sound units and compute their acoustic scores, creating a word graph of word hypotheses and associated probabilities. The third pass shares the language model used in the first pass in conjunction with trigram word models to produce a ranking of the most probable hypotheses.

Besides the above described dictation context and its associated network of language model word searches, a preferred embodiment of the present invention implements three other contexts and associated networks:
select context,
natural language command and control context, and
dynamic command and control context.

The select context feature is to the word sequences displayed in the voice dictation object (VDO). When the user wishes to process a portion of the word sequence produced displayed in the VDO, the select context and its associated command network is used to define the word sequence desired much as a mouse in a keyboard based word processing program may be used to select a portion of text.

A preferred embodiment of the present invention utilizes two independent command context types, one type using a natural language process (NLP) grammar (actually several NLP grammars are used) and one type using a dynamic grammar. When the score from a command and control context is sufficiently small, it means that the given sequence is more probably intended by the user to be a command and control sequence rather than dictated text. Each natural language process grammar utilizes context free grammar rules to parse a sequence of input words and return a score representing the likelihood that a given sequence represents a command and control sequence from the user in natural language format. The dynamic grammar utilizes its own context free grammar and designed to detect and implement the short commands available on a drop-down GUI menu; for example, "Bold on" "Bold off" "Spell check document."

The select and command and control networks utilize acoustic models corresponding to the vocabulary recognized by their respective grammars. They perform recognition searches similar to the first and second pass searches described above with respect to the dictation recognition network, analyzing mixture model distances and producing word graphs of recognition hypotheses and their associated probabilities. By using the cache of mixture model distance calculations produced by the dictation network rather than performing these calculations independently for each recognition network, substantial savings are realized in systems computational resources. Thus, preferred embodiments of the present invention may be implemented in existing commercially available computer systems.

Moreover, preferred embodiments may also realize operating efficiencies by the non-dictation recognition networks "sharing" their respective search beamwidths. As described above, search beamwidth refers to the pruning or deleting of recognition hypotheses which have scores beyond a threshold value set by the best scoring hypothesis. Preferred embodiments prune the poorly scoring hypotheses in the non-dictation networks according to the best overall hypothesis score by any network in conjunction with common threshold values. Thus, rather than have each network produce its n-best scoring hypotheses, networks in which scores are poor compared to the other networks have all or most of their hypotheses pruned off. In other words, rather than considering the best hypotheses from each network, sharing the pruning beamwidth allows preferred embodiments to consider the best scoring hypotheses from all the networks considered as a whole. Again, this results in significant computational efficiencies being realized.

In an alternative embodiment, even greater computational efficiencies may be realized by utilizing a single recognition network such as that described above with respect to the dictation network. The non-dictation contexts such as select context and command and control context would attempt to parse the output of the single recognition network. Recognition results parsed by a given context would be recognized as commands for that context rather than dictated text. This embodiment requires that a careful compromise be reached between the overall system's recognition of a given word or phrase as dictated text or as commands.

As indicated previously, the different recognition contexts and their associated networks employ different types of models and different scoring mechanisms so that the scores are not directly comparable. Relative scaling of the scores is applied to minimize or avoid intrusions by each recognition network on correct translations from the other recognition network. The scoring produced by the dictation network with its combination of acoustic models, multipass language models, and dictation grammar must be adjusted to be comparable with the scoring produced by the select network and the command and control networks.

An arbitration algorithm for selecting among the competing contexts and hypotheses combines and orders the various scores obtained, and then selects the top scoring hypothesis and context for output via the SAPI as appropriate to either the visual display of a user application program by means of a voice dictation object (VDO), or to a command and control function within an application speech center which tracks what actions are occurring within the application.

In a preferred embodiment, the large vocabulary continuous recognition dictation context, the select context and some number of command and control contexts have an initial precedence ordering with respect to the others. For instance, in a preferred embodiment, the highest precedence is assigned to the command and control contexts, then to the select context, and lowest is the dictation context. The arbitration algorithm finds the best scoring parseable hypothesis and its context (all dictation and selection results are considered parseable). If the same hypothesis is parseable by more than one context, the arbitration algorithm selects the hypothesis with the highest precedence. Precedence ordering ensures that when an utterance is recognized by both a command and control context and by the dictation context, the utterance will be treated as a command rather than dictation text, since that is the most likely user-desired action.

In a preferred embodiment, the arbitration algorithm initially generates data structures of sets of (hypothesis, score, list of networks) in a score-ordered queue produced at the recognizer level. From the word graph generated by each network, including dictation, the arbitration algorithm gets the score of the best hypothesis and inserts the set of (hypothesis, score, list of networks) in the score-ordered queue. Until the algorithm is done or the queue is empty: the best hypothesis in the queue is found, and all the sets of (hypothesis, score, list of networks) in the queue which have the same hypothesis and score are found. Then, all the hypotheses not yet in the queue having the same hypothesis and score are found by, for each network not in the list of networks associated with the best hypothesis, analyzing the next hypothesis and score, until the score is worse than the current score (or until some maximum number of hypotheses per context has been reached, e.g., 15). If that is the same hypothesis and score as the current best scoring hypothesis, it is added to the associated list of networks, otherwise, the next hypothesis and score from that network is tested.

At this parsing step, the algorithm determines whether or not to get another (hypothesis, score, list of networks) candidate by checking whether some maximum number of hypotheses has been reached (e.g., 100). There may be more parses than this, since there may be multiple networks per hypothesis, but only a certain maximum number of hypotheses is considered. The hypotheses, in fact, may not be distinct—the same hypothesis may be considered in different networks and with different scores. That is, the same hypothesis may come from the dictation network and from a command and control network at different times, with different scores.

Next, a list of networks associated with this hypothesis is made (often containing only one entry), and this list is ordered by precedence. At the interface level, the list of networks associated with the best scoring hypothesis is translated into a list of contexts associated with the best scoring hypothesis. Then, at the engine level, the first context in the list is found which parses the hypothesis, and if there is such a context it is returned along with its corresponding hypothesis and the algorithm is done. Otherwise, if the queue was empty, the algorithm returns an empty result.

In the normal course, the arbitration algorithm selects a best hypothesis and associated application path to direct it to. If the hypothesis is recognized as dictated text, then that is sent to the VDO. If the hypothesis is recognized as a command to select text or for a command and control grammar, the hypothesis is translated into the appropriate command associated with the recognized hypothesis.

In view of the foregoing it may be seen that several objects of the present invention are achieved and other advantageous results have been attained. As various changes could be made in the above constructions without departing from the scope of the invention, it should be understood that all matter contained in the above description or shown in the accompanying drawings shall be interpreted as illustrative and not in a limiting sense.

What is claimed is:

1. A method for operating a modeless large vocabulary continuous speech recognition system that represents an input utterance as a sequence of input vectors, the method comprising:
    (a) providing, for speech processing in the speech recognition system, a common library of acoustic model states for arrangement in sequences that form acoustic models;
    (b) comparing, for speech processing in the speech recognition system, each vector in a sequence of input vectors to a set of model states in the common library to produce a match score for each model state in the set reflecting the likelihood that such state is represented by such vector; and
    (c) using, for speech processing in the speech recognition system, in a plurality of recognition modules operating in parallel, the match scores with the acoustic models to determine at least one recognition result in each of the recognition modules.

2. A method according to claim 1, wherein each acoustic model is composed of a sequence of segment models and each segment model is composed of a sequence of model states.

3. A method according to claim 1, wherein the match score is a probability calculation or a distance measure calculation.

4. A method according to claim 1, wherein each recognition module includes a recognition grammar used with the acoustic models to determine the at least one recognition result.

5. A method according to claim 4, wherein the recognition grammar is a context-free grammar, a natural language grammar, or a dynamic command grammar.

6. A method according to claim 1, further including:
    (d) comparing the recognition results of the recognition modules to select at least one system recognition result.

7. A method according to claim 6, wherein the step of comparing uses an arbitration algorithm and a score ordered queue of recognition results and associated recognition modules.

8. A method according to claim 1, wherein the plurality of recognition modules includes a dictation module for producing at least one probable dictation recognition result.

9. A method according to claim 1, wherein the plurality of recognition modules includes a command module for producing at least one probable command recognition result.

10. A method according to claim 1, wherein the plurality of recognition modules includes a select module for recognizing a portion of visually displayed text for processing with a command.

11. A method according to claim 1, wherein the plurality of recognition modules includes a dictation module for producing at least one probable dictation recognition result, a select module for recognizing a portion of visually displayed text for processing with a command, and a command module for producing at least one probable command recognition result.

12. A method for operating a modeless large vocabulary continuous speech recognition system that represents an input utterance as a sequence of input vectors, the method comprising:
    (a) providing a common library of acoustic model states for arrangement in sequences that form acoustic models, wherein each acoustic model is composed of a sequence of segment models and each segment model is composed of a sequence of model states;
    (b) comparing each vector in a sequence of input vectors to a set of model states in the common library to produce a match score for each model state in the set reflecting the likelihood that such state is represented by such vector;
    (c) in a plurality of recognition modules operating in parallel, each having an associated recognition grammar, using the match scores with the acoustic models to determine at least one recognition result in each of the recognition modules, wherein the plurality of recognition modules includes a dictation module for producing at least one probable dictation recognition result, a select module for recognizing a portion of visually displayed text for processing with a command, and a command module for producing at least one probable command recognition result; and
    (d) comparing the recognition results of the recognition modules with an arbitration algorithm and a score ordered queue of recognition results and associated recognition modules to select at least one system recognition result.

13. A modeless large vocabulary continuous speech recognition system that represents an input utterance as a sequence of input vectors, the system comprising:

a common library of acoustic model states for arrangement in sequences that form acoustic models for speech processing in the speech recognition system;

an input processor, for speech processing in the speech recognition system, that compares each vector in a sequence of input vectors to a set of model states in the common library to produce a match score for each model state in the set reflecting the likelihood that such state is represented by such vector; and a plurality of recognition modules operating in parallel, for speech processing in the speech recognition system, that use the match scores with the acoustic models to determine at least one recognition result in each of the recognition modules.

14. A system according to claim 13, wherein each acoustic model is composed of a sequence of segment models and each segment model is composed of a sequence of model states.

15. A system according to claim 13, wherein the match score is a probability calculation or a distance measure calculation.

16. A system according to claim 13, wherein each recognition module includes a recognition grammar used with the acoustic models to determine the at least one recognition result.

17. A system according to claim 16, wherein the recognition grammar is a context-free grammar, a natural language grammar, or a dynamic command grammar.

18. A system according to claim 13, further including:

(d) an arbitrator that compares the recognition results of the recognition modules to select at least one system recognition result.

19. A system according to claim 18, wherein the arbitrator includes an arbitration algorithm and a score ordered queue of recognition results and associated recognition modules.

20. A system according to claim 13, wherein the plurality of recognition modules includes a dictation module for producing at least one probable dictation recognition result.

21. A system according to claim 13, wherein the plurality of recognition modules includes a command module for producing at least one probable command recognition result.

22. A system according to claim 13, wherein the plurality of recognition modules includes a select module for recognizing a portion of visually displayed text for processing with a command.

23. A system according to claim 13, wherein the plurality of recognition modules includes a dictation module for producing at least one probable dictation recognition result, a select module for recognizing a portion of visually displayed text for processing with a command, and a command module for producing at least one probable command recognition result.

24. A modeless large vocabulary continuous speech recognition system that represents an input utterance as a sequence of input vectors, the system comprising:

a common library of acoustic model states for arrangement in sequences that form acoustic models, wherein each acoustic model is composed of a sequence of segment models and each segment model is composed of a sequence of model states;

an input processor that compares each vector in a sequence of input vectors to a set of model states in the common library to produce a match score for each model state in the set reflecting the likelihood that such state is represented by such vector;

a plurality of recognition modules and associated recognition grammars, the modules operating in parallel and using the match scores with the acoustic models to determine at least one recognition result in each of the recognition modules, wherein the plurality of recognition modules includes a dictation module for producing at least one probable dictation recognition result, a select module for recognizing a portion of visually displayed text for processing with a command, and a command module for producing at least one probable command recognition result; and an arbitrator that uses an arbitration algorithm and a score ordered queue of recognition results together with their associated recognition modules to compare the recognition results of the recognition modules to select at least one system recognition result.

* * * * *